United States Patent [19]
Gilmore et al.

[11] Patent Number: 5,525,384
[45] Date of Patent: Jun. 11, 1996

[54] FLEXIBLE MOLDING STRIP HAVING INSERTED DECORATIVE CORD AND FURNITURE PROVIDED WITH SUCH STRIPS

[75] Inventors: Keith T. Gilmore, Apple Valley; William L. Beihoffer, Burnsville; Douglas C. Zellmer, Lakeville, all of Minn.

[73] Assignee: Woodland Holding Corporation, Farmington, Minn.

[21] Appl. No.: 371,813

[22] Filed: Jan. 12, 1995

[51] Int. Cl.⁶ .................................................. B60R 13/04
[52] U.S. Cl. .......................... 428/31; 428/67; 428/99; 428/157; 428/167; 428/172; 248/345.1; 52/717.03; 293/128
[58] Field of Search ................... 428/31, 67, 99, 428/157, 167, 172; 248/345.1; 52/717.03; 293/128

[56] References Cited

U.S. PATENT DOCUMENTS

| | | | |
|---|---|---|---|
| Re. 32,819 | 1/1989 | Waugh | 428/67 |
| 1,936,113 | 11/1933 | Jelliffe | 45/137 |
| 2,638,971 | 5/1953 | Furman | 155/184 |
| 2,705,820 | 4/1955 | Torrence | 20/74 |
| 2,980,477 | 4/1961 | Hansen | 311/107 |
| 3,054,643 | 9/1962 | Militano | 297/440 |
| 3,546,725 | 12/1970 | Tambascio | 5/200 |
| 3,590,754 | 7/1971 | Jakobsen | 108/161 |
| 3,752,521 | 8/1973 | Lafebre | 293/128 |
| 3,991,537 | 11/1976 | Brown | 52/717 |
| 4,184,724 | 1/1980 | Katz et al. | 312/209 |
| 4,274,237 | 6/1981 | Hagstrom | 52/312 |
| 4,351,864 | 9/1982 | Giannakidis | 428/31 |
| 4,370,373 | 1/1983 | Janicz | 428/151 |
| 4,397,896 | 8/1983 | Moran | 428/31 |
| 4,453,324 | 6/1984 | Greenberger | 40/5 |
| 4,503,780 | 3/1985 | Apissomian | 108/27 |
| 4,558,553 | 12/1985 | Kolk | 52/829 |
| 4,810,550 | 3/1989 | Gasser | 428/100 |
| 4,856,253 | 8/1989 | Jou | 52/717.1 |
| 4,877,657 | 10/1989 | Yaver | 428/31 |
| 4,971,849 | 11/1990 | Azzar | 428/100 |
| 5,026,588 | 6/1991 | Diekmann | 428/100 |
| 5,120,110 | 6/1992 | Tseng | 297/445 |
| 5,155,952 | 10/1992 | Herwegh et al. | 52/100 |

FOREIGN PATENT DOCUMENTS 3442216  7/1985  Germany ........................ 280/770

OTHER PUBLICATIONS

Product Sheets: Various "T" Moldings; Silvatrim Corporation of America, South Plainfield, NJ (pp. T-01 through T-09; Jun. 1984).

Primary Examiner—Alexander S. Thomas
Attorney, Agent, or Firm—James V. Harmon

[57] ABSTRACT

A flexible ornamental or protective plastic molding strip has an inserted flexible decorative cord. The flexible molding strip which serves as a base strip has an exposed outer surface that is usually smoothly contoured but can, if desired, be provided with longitudinally extending depressed or projecting surface decoration. In the exposed surface are one or more longitudinally extending grooves. Into each groove is inserted a flexible decorative cord, preferably of a color selected to provide an appealing visual effect, usually a color which contrasts with the color of the base strip itself. The decorative cord can be easily inserted into the groove by pressing it into place either at the factory or at the job site, to harmonize with the decor. The cord can be removed and replaced at any time desired, yet will be held securely in the groove by its contact with the walls of the groove during normal use.

14 Claims, 4 Drawing Sheets

5,525,384

FLEXIBLE MOLDING STRIP HAVING INSERTED DECORATIVE CORD AND FURNITURE PROVIDED WITH SUCH STRIPS

FIELD OF THE INVENTION

This invention relates to flexible molding strips and more particularly to a flexible molding strip used for protecting or decorating furniture or appliances and to furniture utilizing such molding strips.

BACKGROUND OF THE INVENTION

Flexible molding strips have been used for decorating and protecting various items as shown, for example, in U.S. Pat. No. 3,590,754. However, there is no provision in the patent for enabling the decorative strip to be customized to harmonize with the decor of the room or the furniture. Consequently, it is not possible to add a feature that will color coordinate any molding strip to match the decor of the room or the furniture. It has also been proposed to attach a strip of colored pressure-sensitive tape to an article for decoration, but the proposed product is not sufficiently durable for commercial use on furniture because the decorative tape can be stripped away from the underlying article. In addition, colored adhesive tape is relatively expensive and the proper positioning of the tape on an article is a time consuming, labor intensive operation which has prevented such tape from being used commercially on furniture.

It has also been previously proposed in U.S. Pat. No. 5,120,110 to provide a flexible decorative strip and to press-fit the decorative strip directly into a rigid chair frame that is specially made with dovetail grooves on an exposed surface. This arrangement requires rigid chair frame members having an unusual custom-made form. This makes it unsuitable for a wide range of wooden furniture that lacks dovetail grooves. In addition, the strip has only one piece and thus provides only one color.

In contrast to the prior art, it is a major objective of the invention to provide a decorative strip or base strip that can be attached to any of a variety of furniture or appliance items and to provide an additional ornamentation for the strip that can be used to achieve a pleasing color effect or additional protection to prevent the decorative strip from being damaged or marred.

Another important object of the invention is to provide a flexible decorative strip with an ornamental surface member which is also flexible and which can be manually inserted and removed as required by workmen on the job site to allow the decorative strip to harmonize better with the decor of the room in which it is to be used.

A more specific object is to enable a workman to add to a decorative strip any of a variety of colors of flexible material for decorating the surface of an ornamental molding strip so as to easily create any of a variety of different, pleasing visual effects with a minimum of material.

A further object is to provide a flexible decorative strip which can be custom color coordinated with the decor and which is still rugged in construction, low in cost, and can be readily assembled to provide any of a variety of colors either at the factory or at the job site.

These and other more detailed and specific objects of the present invention will be better understood by reference to the following figures and detailed description which illustrate by way of example but a few of the various forms of the invention within the scope of the appended claims.

SUMMARY OF THE INVENTION

This invention provides a flexible ornamental or protective molding strip having an inserted decorative cord. The flexible molding strip which serves as a base strip has an exposed outer surface that is usually smoothly contoured but can, if desired, be provided with longitudinally extending depressed or projecting surface decoration. In the exposed surface are one or more longitudinally extending grooves. Into each groove is inserted a flexible decorative cord, preferably of a color selected to provide an appealing visual effect, usually a color which contrasts with the color of the base strip itself. The decorative cord can be inserted into the groove by easily pressing it into place, either at the factory or at the job site, to harmonize with the decor. The cord can be removed and replaced at any time desired, yet will be held securely in the groove by its contact with the walls of the groove during normal use. The base strip and the inserted decorative cord can be formed from any suitable flexible plastic material such as polyethylene, flexible polyvinylchloride or polypropylene, as well as other well known plastic materials. Both the base strip and the inserted strip are preferably formed in continuous lengths by extrusion molding in any suitable manner known to those skilled in the art and packaged for distribution in various lengths such as 250-foot coils.

DETAILED DESCRIPTION OF THE INVENTION

Figure 1:
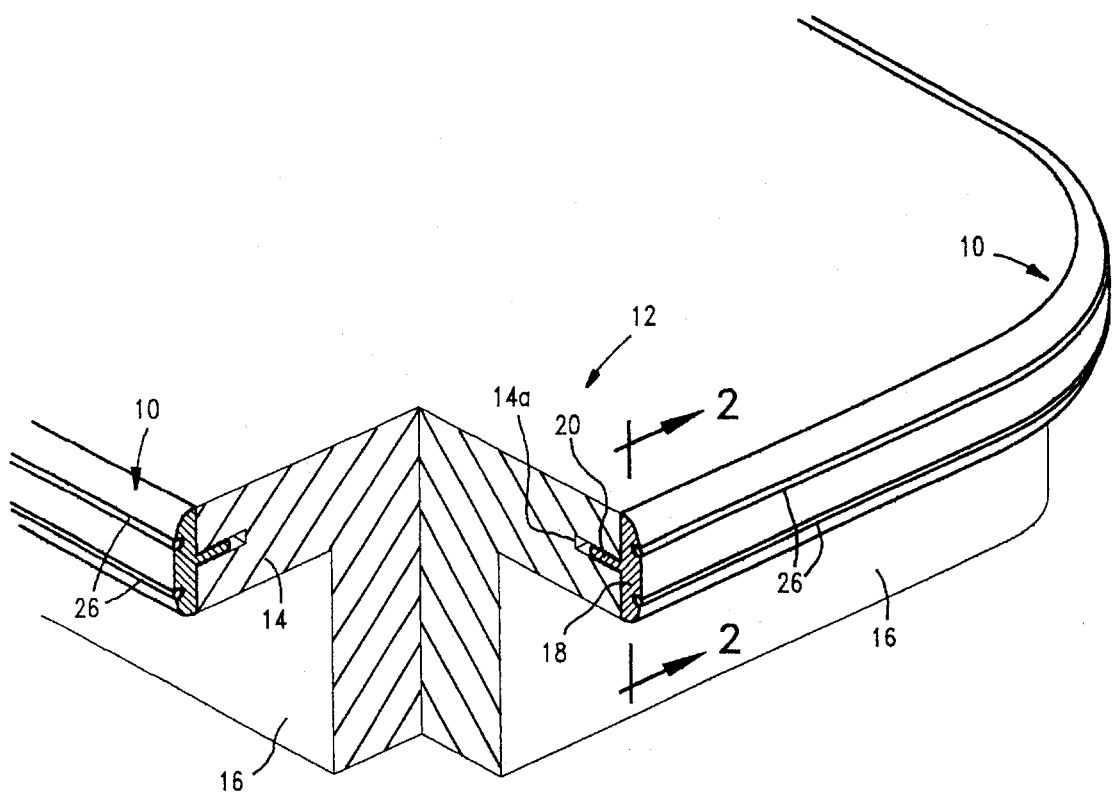
FIG. 1 is a perspective view partly in section of a furniture item employing a decorative molding strip in accordance with the invention.
Figure 2:
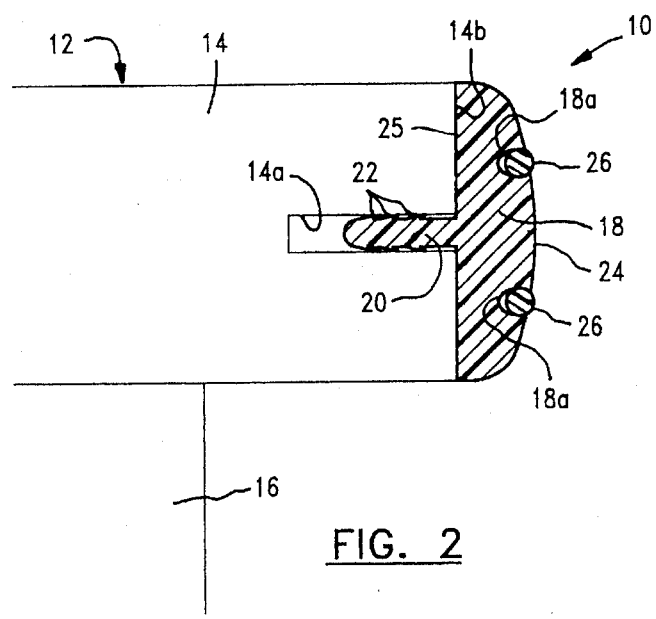
FIG. 2 is a cross-sectional view taken on line 2—2 of FIG. 1 on a larger scale.

The invention is illustrated in FIGS. 1 and 2 by way of example in connection with a piece of furniture represented by a desk or countertop 12. It will be understood, however, that the invention can be used with other kinds of furniture or electrical appliances, e.g., desks; chairs; conference tables; countertops such as countertops for reception areas, sales counters, mailrooms, etc.; kitchen, dining room and coffee tables; recreational vehicles; boats; as well as residential and commercial appliances. The term "furniture" herein is used broadly to include all items of a general class including appliances of which the above items are examples.

The furniture item 12 is provided with a top 14 and a base portion 16. The top 14 has an outer peripheral edge 14b to which one of the flexible protective and decorative molding strips 10 in accordance with the invention is applied. The molding strip 10 serves as a base strip and is formed from an elongated molded piece of flexible plastic resin defining a resinous body 18 with a flat concealed lower surface 25 that, during use, is placed in contact with the outer surface 14b of the furniture item 12. At the center of the lower surface 25 is an elongated, longitudinally extending, outwardly projecting integral connecting flange 20 having laterally extending retaining barbs 22. While the connecting flange 20 provides a preferred method of fastening the decorative molding strip 10 to the furniture item 12, it can be secured in place by other means as by means of fasteners such as tacks, staples or adhesive (not shown). When the molding strip 10 is to be applied to the furniture item 12, the connecting flange 20 is forced into an elongated groove 14a that extends the entire length of the exposed edge 14b. This can be done by pressing flange 20 into the groove 14a manually or by hammering it into place. The pressure caused by compression of the retaining barbs 22 reliably secures the connecting flange 20 in place and holds the decorative molding strip 10 against the edge 14b of the furniture item 12, thereby helping to protect it from wear and abrasion as well as providing a very pleasing decorative function.

The molding strip 10 has an exposed surface 24 opposite from the flat lower surface 25 that is visible when the strip 10 is applied to the furniture item 12. The term "outer" and "lower" are used broadly herein in a relative sense with respect to one another. Extending longitudinally in the exposed surface 24 throughout the length of the base strip 10 are one or more grooves 18a. The grooves 18a can have any suitable cross-sectional configuration as, for example, V-shaped, heart-shaped, circular, etc., preferably with upper edges that define centrally projecting rims.

Either at the factory or when the decorative strip 10 is to be installed, a second flexible strip member comprising a flexible cord 26, also formed from plastic resin, is inserted by being pressed into the grooves 18a in the molding strip 10. The flexible plastic cord 26 is sized appropriately for insertion into the groove 18a in the base strip 10 and is preferably slightly larger than the groove itself to provide a frictional fit or a snap fit into the groove 18a. The cord 26 can be inserted manually or forced into place by tapping it in with a hammer, either before or after the molding strip 10 is applied to the furniture item 12. However, in a typical application where installation is done at a job site, the cord 26 is inserted afterward. The cord 26 is held in the groove 18a by contact with the walls of the groove and by the rim portions of the groove which partially encircle outer portions of the cord 26 to thereby physically enclose the cord 26 so as to reliably hold it in place.

Once the cord 26 has been inserted into the groove 18a as shown in FIG. 2, a pair of connected flexible plastic strips 10 and 26 are provided. The molding strip 10 supports the cord 26 so that the cord has an exposed portion (visible in FIG. 1) to create a pleasing decorative effect or to assist in protecting the molding strip 10, e.g., from abrasion. Where the cord 26 is to provide primarily a decorative function, it can be furnished in any of a variety of contrasting colors to provide a pleasing decorative visual effect by harmonizing with the decor of the furniture and the room in which the furniture is located. Where the cord 26 is to provide a protective function, it preferably projects outwardly from the surface 24 of the base strip 10 and can be formed, if desired, from a material that is harder than the molding strip 10 to enhance its ability to protect molding strip 10.

Figure 3:
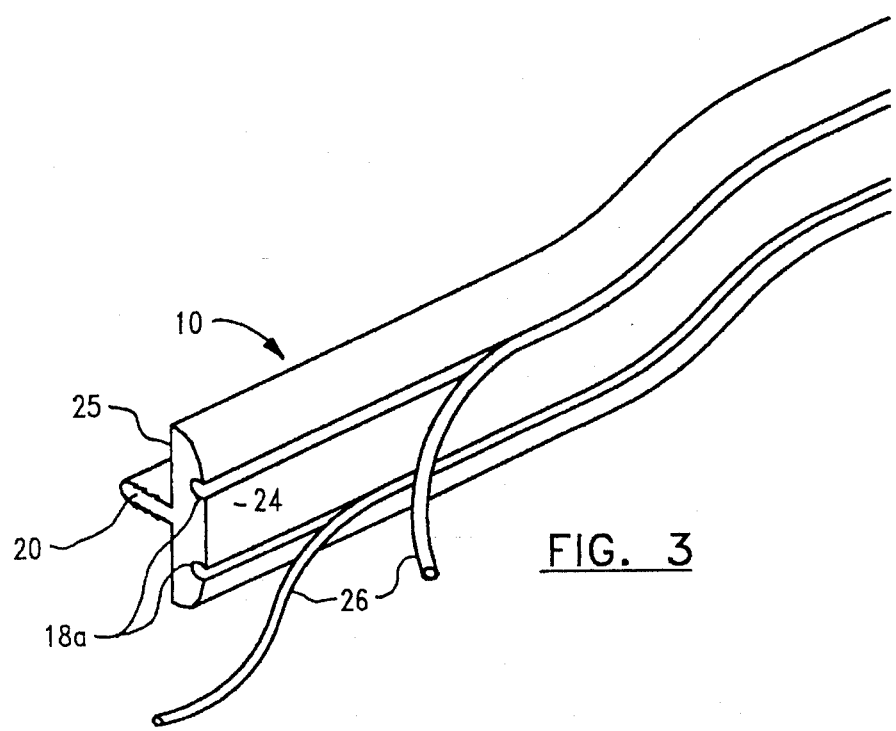
FIG. 3 is a perspective view of a decorative molding strip in accordance with the invention shown the insertion of two ornamental cords into grooves in the exposed surface of the strip.

FIG. 3 illustrates the insertion of the cord 26 into the molding strip 10. Insertion is preferably accomplished by pressing the cord 26 into the grooves 18a progressively along the length of the strip 10, e.g., from right to left as shown in FIG. 3.

The flexible insertable cord 26 comprises an elongated flexible body of plastic resin, preferably formed by extrusion molding, and can be stored in coils in any of a variety of colors produced by using different colored plastic resins or, if desired, can be painted or coated, for example by an electro-deposited metal coating such as a vacuum metallized coating of aluminum, or it can have other kinds of decorative coatings known to the art.

Figure 5:
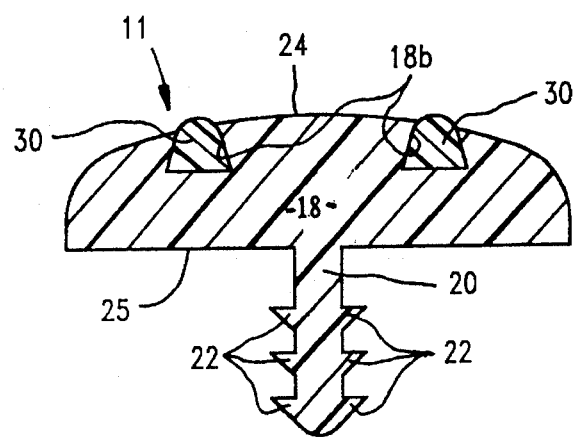
FIG. 5 is a cross-sectional view of a decorative strip in accordance with another embodiment of the invention.

Refer now to the remaining figures which illustrate modified forms of the invention wherein the same numerals refer to corresponding parts already described. In FIG. 5, the decorative molding strip 11 is provided with grooves 18b that are wider at the bottom than at the top. The cords 30 have a corresponding shape and are thus reliably held in place by being dovetailed or rabbeted in the grooves 18b.

Figure 6:
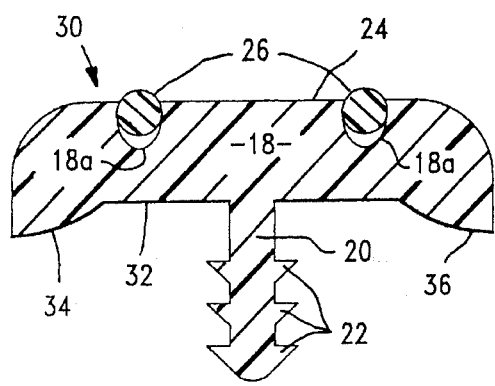
FIG. 6 is a cross-sectional view of a decorative strip in accordance with another embodiment of the invention.

In one preferred form of the invention, the inner surface of the decorative molding strip is not flat as depicted at 25 in FIGS. 1–4 but is provided with a longitudinally extending central concavity so that side edge portions extend downwardly, i.e., away from the exposed surface 24. In FIG. 6, for example, the decorative strip 30 is provided with rounded longitudinally extending projections 34, 36 which project downwardly away from surface 24 so that the center portion 32 of the lower surface of the decorative strip 30 is elevated above the downward projections 34, 36. Thus, the longitudinal projections 34, 36 jut downwardly from the center portion 32 of the lower surface.

Figure 7:
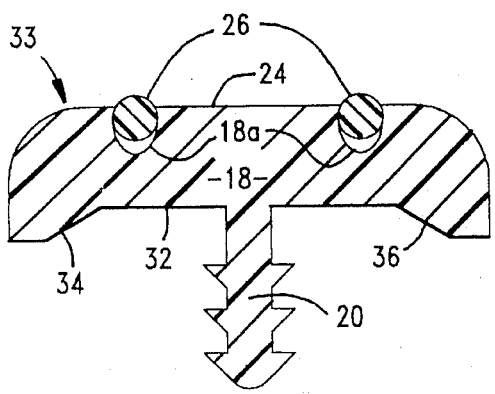
FIG. 7 is a cross-sectional view of a decorative strip in accordance with another embodiment of the invention.

Similarly, in FIG. 7 the longitudinal projections 34, 36 extend downwardly below the center portion 32 of the lower surface of the strip, but instead of being curved as in FIG. 6, they have an angular shape with an inclined centrally projecting surfaces.

Figure 8:
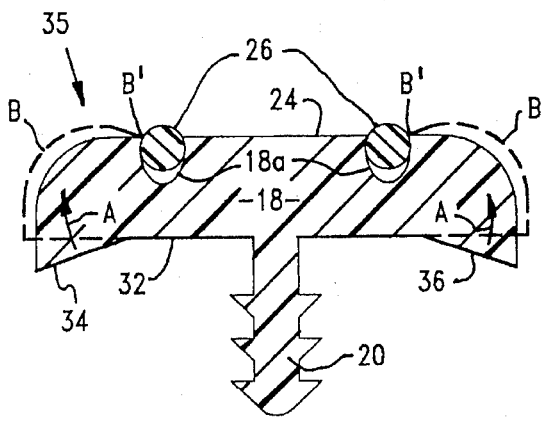
FIG. 8 is a cross-sectional view of a decorative strip in accordance with another embodiment of the invention.

In FIG. 8, the strip 35 is provided with longitudinally extending projections 34, 36 of still another shape including downwardly facing, centrally and upwardly inclined surfaces.

Figure 9:
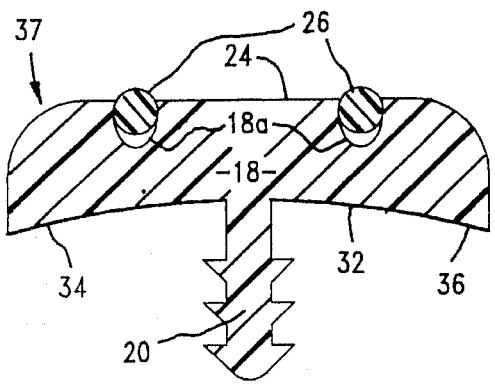
FIG. 9 is a cross-sectional view of a decorative strip in accordance with another embodiment of the invention.
Figure 10:
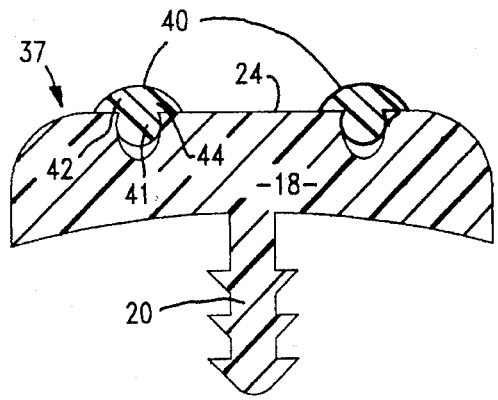
FIG. 10 is a cross-sectional view of a decorative strip in accordance with another embodiment of the invention.
Figure 11:
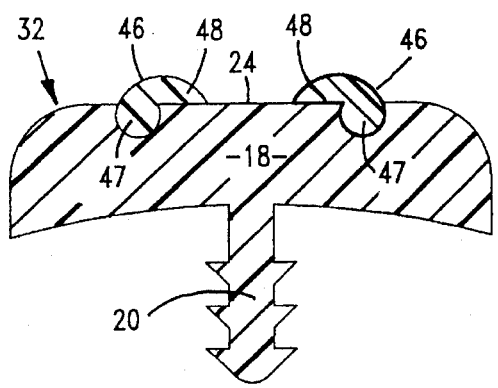
FIG. 11 is a cross-sectional view of a decorative strip in accordance with another embodiment of the invention.

In FIGS. 9–11, the strips 37 all have a concave arcuate lower surface 32 with downwardly projecting edge portions 34, 36 which extend longitudinally.

Figure 12:
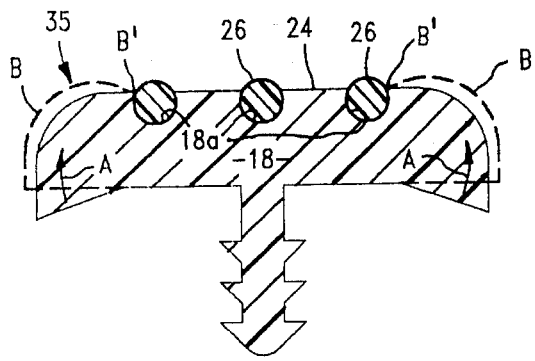
FIG. 12 is a cross-sectional view of a decorative strip in accordance with another embodiment of the invention.

Refer now to FIGS. 8 and 12 which illustrate the benefit provided by the raised center and downwardly projecting edge portions 34, 36. When the body portion 18 of the base molding strip is fastened to the furniture item, the downwardly projecting edge portions 34, 36 will be deflected upwardly by contact with the exposed surface 14b and will be displaced from the solid line position to the dotted line position B. This, in turn, produces a compressive force toward the center of the top surface 24 at B' on each side of the strip. The centrally directed compressive force at B' helps to clasp or pinch the inserted cords 26 in the grooves 18a so as to more securely hold them in place. The invention in this way provides a pinching effect for assuring more reliable retention of the flexible cords 26 in their respective grooves 18a.

Refer now to FIG. 9 which illustrates a decorative cord of a different shape. As shown in FIG. 9, the base strip is provided with a pair of laterally spaced apart grooves into which is placed a cord 40 having a generally cylindrical lower portion and an enlarged head portion that is rounded on its upper surface with laterally extending shoulder portions 42, 44 which overlap portions of the upper surface of the strip 37 on either side of the groove.

FIG. 10 is similar except that the flexible cord 46, in this case, has a lower portion 47 with a round cross-section and a curved upper portion 46 having a lateral extension 48 that projects only on one side of the lower inserted portion 47 of the cord 46. In this case the cords 46 are mounted so that the projections 48 extend centrally, covering portions of the upper surface 24 centrally of the grooves into which the cords 46 are inserted.

FIG. 12 illustrates a variation in which three cords 26 are inserted into grooves 18a in the top surface of the decorative strip 35.

Figure 13:
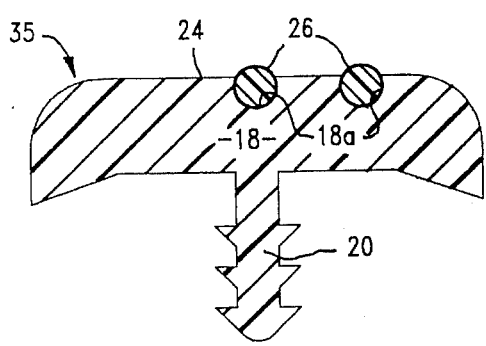
FIG. 13 is a cross-sectional view of a decorative strip in accordance with another embodiment of the invention.

FIG. 13 illustrates a variation in which two cords 26 are inserted into grooves 18a in the surface 24, one groove 18a being offset and the other being located at the center of the decorative strip 35.

Figure 14:
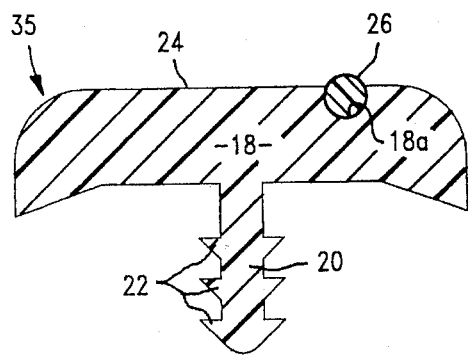
FIG. 14 is a cross-sectional view of a decorative strip in accordance with another embodiment of the invention.

FIG. 14 is similar to FIG. 13 except that only a single groove 18a is provided in an offset location extending longitudinally of the base strip 35.

Figure 15:
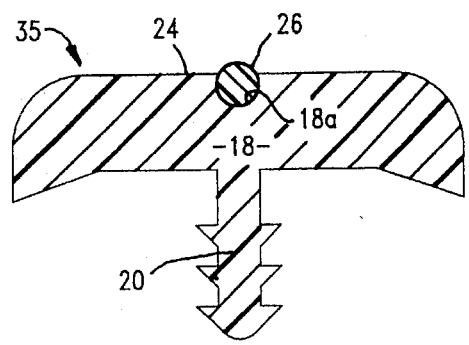
FIG. 15 is a cross-sectional view of a decorative strip in accordance with another embodiment of the invention.

FIG. 15 is like FIG. 13 except that only one centrally positioned groove 18a is provided so that the cord 26 extends longitudinally of the base strip 35 at the center of the exposed surface 24.

Figure 16:
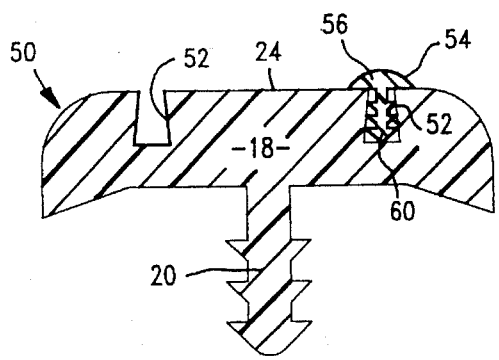
FIG. 16 is a cross-sectional view of a decorative strip in accordance with another embodiment of the invention.

FIG. 16 shows a pair of dovetail grooves 52 in the exposed surface 24 of a decorative strip 50. In the groove 52 at the right is a decorative cord 54 having head portion 56 and a longitudinally extending, inwardly facing integral connecting flange 60 which is provided with laterally projecting barbs 62.

Figure 17:
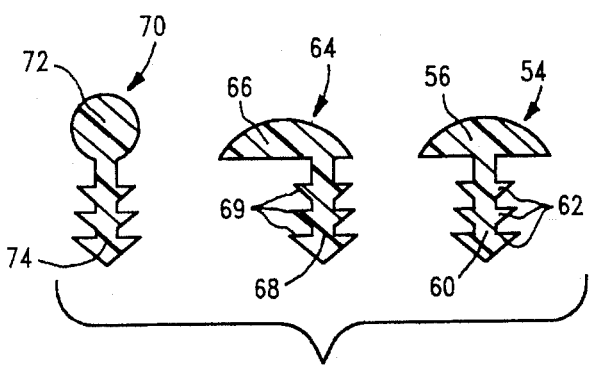
FIG. 17 is a cross-sectional view of three different kinds of insertable ornamental cords in accordance with the invention.

At the center of FIG. 17 is shown another modified form of the invention, in this case a cord 64 with a head 66 having a curved upper surface that is offset with respect to a longitudinally extending, downwardly projecting connecting flange 68, also provided with retaining barbs 69.

At the left in FIG. 17 is shown another form of cord 70 having a round or rod-shaped body portion 72 and a downwardly projecting, longitudinally extending connecting flange 74. The connecting flanges of any one of the cords 54, 64, 70 can be inserted into a groove with straight side walls or a groove 52 with dovetail side walls as shown in the base strip 50 of FIG. 16.

Figure 18:
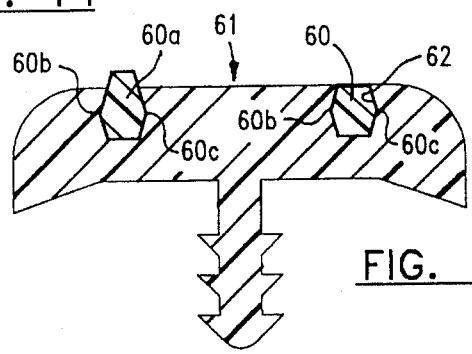
FIG. 18 is a cross-sectional view of another form of the invention.

FIG. 18 shows another molding strip 61 with a different form of cord 60 and groove 62. The cord 60 in this case is hexagonal in cross-section with flat upper and lower surfaces. The groove 62 is similarly shaped. The cord 60 at the right is sized to be flush with the surface of the strip 61 while the cord 60a at the left projects above the surface of strip 61. The outwardly projecting, obliquely related side walls of the cord 60 which intersect at 60b and 60c help to hold the cord 60 in place in strip 61.

Other variations can be made in the invention. For example, the decorative cord can have other suitable cross-sectional shapes and can have an upper surface that is flush with the exposed surface 24 of the decorative molding strip 10. It can also be recessed below the surface 24, if desired, but this form is not preferred where the cord is to provide a protective function.

Figure 4:
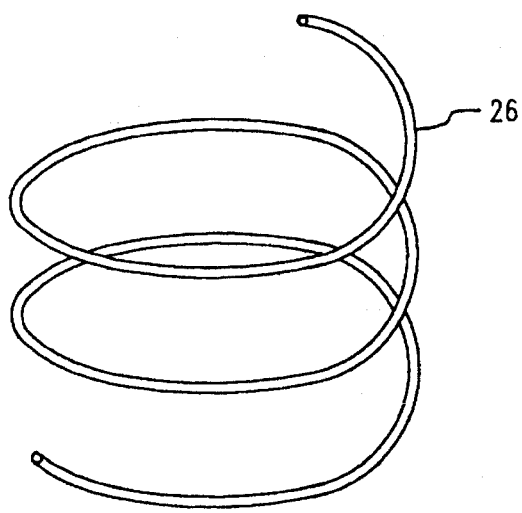
FIG. 4 is a perspective view of a piece of decorative cord material before use.

The invention is strong, durable, and low in cost. The cords 26 can be easily changed to provide color variations to match or contrast with the decor or provide other interesting and pleasing visual effects. In addition, a workman can easily and quickly install the cords 26 at a work site or can remove the cords and replace them, when desired, to provide a different effect. The installation kit carried by the workman will normally contain a number of coils of cord as shown in FIG. 4 in a variety of colors to suit different decorating requirements.

Many variations of the present invention within the scope of the appended claims will be apparent to those skilled in the art once the principles described herein are understood.

What is claimed is:

1. A flexible protective or decorative molding strip for furniture comprising, a first flexible strip member comprising an elongated base strip of flexible plastic resin having a lower surface to be placed into contact with a surface of a furniture item, and said strip having an exposed outer surface that is visible when the base strip is affixed to the furniture items, a groove formed in the exposed outer surface of the base strip and running longitudinally thereof, a second flexible strip member comprising a flexible cord formed from plastic resin that is sized for insertion in the base strip by being pressed into the groove in the base strip, said cord, after being inserted into the groove, forming a pair of connected flexible plastic strips wherein the base strip supports the cord so that the cord has an exposed portion that is visible to create a pleasing decorative effect or to assist in protecting the molding strip from abrasion, and the insertable cord is circular in cross-section.

2. A flexible protective or decorative molding strip for furniture comprising, a first flexible strip member comprising an elongated base strip of flexible plastic resin having a lower surface to be placed into contact with a surface of a furniture item, and said strip having an exposed outer surface that is visible when the base strip is affixed to the furniture item, a groove formed in the exposed outer surface of the base strip and running longitudinally thereof, a second flexible strip member comprising a flexible cord formed from plastic resin that is sized for insertion in the base strip by being pressed into the groove in the base strip, said cord, after being inserted into the groove, forming a pair of connected flexible plastic strips wherein the base strip supports the cord so that the cord has an exposed portion that is visible to create a pleasing decorative effect or to assist in protecting the molding strip from abrasion, and groove is generally V-shaped in configuration.

3. A flexible protective or decorative molding strip for furniture comprising, a first flexible strip member comprising an elongated base strip of flexible plastic resin having a lower surface to be placed into contact with a surface of a furniture item, and said strip having an exposed outer surface that is visible when the base strip is affixed to the furniture item, a groove formed in the exposed other surface of the base strip and running longitudinally thereof, a second flexible strip member comprising a flexible cord formed from plastic resin that is sized for insertion in the base strip by being pressed into the groove in the base strip, and said cord, after being inserted into the groove, forming a pair of connected flexible plastic strips wherein the base strip supports the cord so that the cord has an exposed portion that is visible to create a pleasing decorative effect or to assist in protecting the molding strip from abrasion, and the cord has an enlarged head.

4. The molding strip of claim 3 wherein the enlarged head has a rounded exposed surface and the cord includes a downwardly extending connecting flange that projects from the head of the cord.

5. The molding strip of claim 4 wherein said head portion of the cord is offset with respect to the connecting flange.

6. A flexible protective or decorative molding strip for furniture comprising, a first flexible strip member comprising an elongated base strip of flexible plastic resin having a lower surface to be placed into contact with a surface of a furniture item, and said strip having an exposed outer surface that is visible when the base strip is affixed to the furniture item, a groove formed in the exposed outer surface of the base strip and running longitudinally thereof, a second flexible strip member comprising a flexible cord formed from plastic resin that is sized for insertion in the base strip by being pressed into the groove in the base strip, and said cord, after being inserted into the groove, forming a pair of connected flexible plastic strips wherein the base strip supports the cord so that the cord has an exposed portion that is visible to create a pleasing decorative effect or to assist in protecting the molding strip from abrasion, and the cord has a rod-shaped head portion and a longitudinally extending connecting flange portion extending downwardly therefrom.

7. A flexible molding strip for a product comprising, a first flexible strip member comprising an elongated base strip of flexible plastic resin having a lower surface to be placed into contact with a surface of the product, and said strip having an exposed outer surface that is visible when the base strip is affixed to the product, a groove formed in the exposed outer surface of the base strip and running longitudinally thereof, a second flexible strip member comprising a flexible cord formed from plastic resin that is sized for insertion by being pressed into the groove in the base strip, said lower surface has an elevated central portion and downwardly projecting edge portions extending longitudinally along spaced apart side edges thereof whereby the mounting of the molding strip onto said surface of said product will cause edge portions of the molding strip to be deflected upwardly to provide a centrally directed compressive force on the exposed upper surface of the molding strip, and the flexible cord has a hexagonal cross-sectional shape with outwardly projecting side walls that intersect at an oblique angle.

8. A flexible molding strip for a product comprising, a first flexible strip member comprising an elongated base strip of flexible plastic resin having a lower surface to be placed into contact with a surface of the product, and said strip having an exposed outer surface that is visible when the base strip is affixed to the product, a groove formed in the exposed outer surface of the base strip and running longitudinally thereof, a second flexible strip member comprising a flexible cord formed from plastic resin that is sized for insertion by being pressed into the groove in the base strip, said lower surface has an elevated central portion defining a longitudinally extending central concavity and downwardly projecting edge portions extending longitudinally along spaced apart side edges thereof whereby the mounting of the molding strip onto said surface of said product will cause edge portions of the molding strip to be deflected upwardly to provide a centrally directed compressive force on the exposed upper surface of the molding strip.

9. A flexible protective or decorative molding strip for furniture comprising, a first flexible strip member comprising an elongated base strip of flexible plastic resin having a lower surface to be placed into contact with a surface of a furniture item, and said strip having an exposed outer surface that is visible when the base strip is affixed to the furniture item, a groove is present in the exposed outer surface of the base strip and runs longitudinally thereof, a second flexible strip member comprising a flexible cord formed from plastic resin that has a round cross-section and is sized for insertion in the base strip by being pressed to the groove in the base strip, the groove terminates upwardly in laterally spaced parallel upper edges that define centrally projecting rims, the groove has walls that approach one another above the cord to partially surround the cord, the cord is held in place by contact with the walls of the groove beneath the rims of the groove and the rims extend over portions of the cord to thereby physically enclose the cord so as to hold the cord in place within the groove, said cord, when inserted into the groove, forms a pair of connected flexible plastic strips wherein the base strip supports the cord so that the cord has an exposed portion that is visible to create a pleasing decorative effect or to assist in protecting the molding strip from abrasion.

10. The molding strip of claim 9 wherein the cord is removably and interchangeably mountable in said groove whereby the cord can be installed and removed or replaced as desired to provide different effects.

11. The molding strip of claim 9 wherein the groove and the cord have a similar cross-sectional shape and the cord contacts an inside surface of the groove.

12. The molding strip according to claim 9 wherein the groove is a dovetail groove that is wider at the bottom than at the top and the cord is held removably in place in the groove by contact with walls of the dovetail groove.

13. The molding strip of claim 9 in combination with a furniture article having a surface with an elongated slot therein, the molding strip is mounted upon the surface having the slot therein, and the connecting flange is engaged within the slot in the furniture article.

14. A flexible protective or decorative molding strip for furniture comprising, a first flexible strip member comprising an elongated base strip of flexible plastic resin having a lower surface to be placed into contact with a surface of a furniture item, and said strip having an exposed outer surface that is visible when the base strip is affixed to the furniture item, a groove is present in the exposed outer surface of the base strip and runs longitudinally thereof, a second flexible strip member comprising a flexible cord formed from plastic resin that has a round cross-section and is sized for insertion in the base strip by being pressed into the groove in the base strip, the groove terminates upwardly in laterally spaced parallel upper edges that define centrally projecting rims, the groove has walls that approach one another above the cord to partially surround the cord, the cord is held in place by contact with the walls of the groove beneath the rims of the groove and the rims extend over portions of the cord to thereby physically enclose the cord so as to hold the cord in place within the groove, said cord, when inserted into the groove, forms a pair of connected flexible plastic strips wherein the base strip supports the cord so that the cord has an exposed portion that is visible to create a pleasing decorative effect or to assist in protecting the molding strip from abrasion, the molding strip has a longitudinally extending connecting flange projecting downwardly from the lower surface thereof for fastening the decorative strip to said furniture, and the lower surface of the molding strip has an elevated central portion from which the connecting flange extends whereby the mounting of the molding strip onto said surface of said furniture item will cause edge portions of the molding strip to be deflected upwardly to provide a centrally directed compressive force at the exposed upper surface of the molding strip for pinching the cord in the groove.

* * * * *